(12) United States Patent
Chen et al.

(10) Patent No.: US 7,092,387 B2
(45) Date of Patent: Aug. 15, 2006

(54) METHOD AND SWITCH CONTROLLER FOR EASING FLOW CONGESTION IN NETWORK

(75) Inventors: Jen-Kai Chen, Taipei (TW); Chao-Cheng Cheng, Taipei (TW); Jiann-Hwa Liou, Taichung (TW)

(73) Assignee: VIA Technologies, Inc., Taipei Hsian (TW)

( * ) Notice: Subject to any disclaimer, the term of this patent is extended or adjusted under 35 U.S.C. 154(b) by 982 days.

(21) Appl. No.: 09/821,428

(22) Filed: Mar. 29, 2001

(65) Prior Publication Data

US 2001/0050913 A1    Dec. 13, 2001

(30) Foreign Application Priority Data

Apr. 1, 2000  (TW) .............................. 89106159 A

(51) Int. Cl.
    *H04L 12/50* (2006.01)
(52) U.S. Cl. ....................................................... 370/360
(58) Field of Classification Search ................ 370/279, 370/351–360, 389, 392, 394, 395.1, 395.2, 370/395.21, 400, 412–420, 428, 429, 464, 370/465, 468
    See application file for complete search history.

(56) References Cited

U.S. PATENT DOCUMENTS

| | | | | |
|---|---|---|---|---|
| 5,724,358 A | * | 3/1998 | Headrick et al. | 370/418 |
| 5,764,641 A | * | 6/1998 | Lin | 370/412 |
| 5,838,677 A | * | 11/1998 | Kozaki et al. | 370/389 |
| 5,923,654 A | | 7/1999 | Schneel | |
| 6,094,435 A | * | 7/2000 | Hoffman et al. | 370/414 |
| 6,532,234 B1 | * | 3/2003 | Yoshikawa et al. | 370/395.4 |
| 6,577,625 B1 | * | 6/2003 | Chiou et al. | 370/381 |
| 6,614,756 B1 | * | 9/2003 | Morgenstern et al. | 370/230 |
| 6,625,159 B1 | * | 9/2003 | Singh et al. | 370/413 |

\* cited by examiner

*Primary Examiner*—Dmitry Levitan
(74) *Attorney, Agent, or Firm*—J.C. Patents

(57) ABSTRACT

A method for easing data transmission congestion in a switch device having a plurality of ports. The switch device includes a shared buffer capable of dividing into a plurality of buffering units. The method comprises the steps as follows. A plurality of output queues are provided, in which the output queues have a one-to-one correspondence with the ports, and each output queue has a number of reserved buffering units. The buffering unit(s) are then assigned in the shared buffer. A packet is received from a source port and storing the packet in an assigned buffering unit. The target port of a packet is determined according to a header of the packet. Then, the buffering unit containing the packet is linked to the output queue that corresponds to the target port. The free buffering units are thus controlled according to a number of reserved buffering units in the output queue and a triggering or a terminating condition of the source port.

17 Claims, 5 Drawing Sheets

METHOD AND SWITCH CONTROLLER FOR EASING FLOW CONGESTION IN NETWORK

CROSS-REFERENCE TO RELATED APPLICATION

This application claims the priority benefit of Taiwan application serial no. 89106159, filed Apr. 1, 2000. This application also provides prior art reference U.S. Pat. No. 5,923,654.

BACKGROUND OF THE INVENTION

1. Field of Invention

The present invention relates to a network switch. More particularly, the present invention relates to a switch controller capable of easing flow congestion in a network.

2. Description of Related Art

Ethernet is probably the most widely used local area network (LAN) in electronic communication. However, due to a data transmission rate of mere 10 Mbps, a conventional Ethernet can hardly transmit the vast quantity of data flow required in a multi-media system. Consequently, a faster Ethernet system having a data transmission rate of 100 Mbps called Fast Ethernet appears. In the Fast Ethernet design, a reconciliation sublayer is introduced between a medium access control (MAC) sublayer and a physical medium dependency (PMD) sublayer. To use the Fast Ethernet system, the network interface card in each network workstation has to be replaced by a 100 Mbps fast Ethernet interface card. The network interface card in each workstation can also be retained, however, a switch device must be employed. In fact, in order to retain the original network interface card in each workstation, the 10 Mbps Ethernet equipment formerly invested by a company can be incorporated into the Fast Ethernet network through the switch device.

A workstation with a conventional Ethernet utilizing a twisted pair, disregarding whether the data transmission rate is 10 Mbps or 100 Mbps, is connected to a server via an Ethernet hub. In general, the bandwidth of an Ethernet hub is normally shared by all the workstations connected to the network. For example, for a 16 port 100 Mbps Ethernet hub, if four workstations are connected to the network, the bandwidth is shared between four workstations. On the other hand, if each of the 16 ports is connected to a workstation, the bandwidth is shared between all sixteen workstations. As the number of network user increases, the number of collisions in the network increases proportionately. Hence, network bandwidth for each user decreases while users increase. In a multimedia-craved world, a conventional Ethernet hub can not meet the traffic demanded by booming users.

The switch device intends to improve data flow so that each of the workstations connected to the device is able to enjoy faster data transmission. To achieve correct data switching, the switch device must register various connections between each workstation and each port. In other words, the switch device must have a module for recording all the addresses in a way similar to a bridging device. When the switch device receives a frame, the device will consult a path lookup table to find the port of the target workstation. If the target workstation is found, a controller will send out a control signal to the switch element and redirecting the frame to the port. On the contrary, if the target workstation is not found, the frame is broadcast to all the ports just to ensure that the target workstation is able to receive this frame.

The institute of electrical & electronics engineering (IEEE) has recently provided a standard specification 802.3u for network management 802.3u capable of simplifying network management. The IEEE standard 802.3u introduces an 'auto-negotiation' function, also known as an N-way function. The 'auto-negotiation' function enables the switch device and the Ethernet interface card of a workstation to learn each others' state, which may have various combinations as shown in Table I. An N-way switch device can learn the data transmission rate (10 Mbps or 100 Mbps) and multiplexing mode (full duplex or half-duplex) for each Ethernet interface card to employ a proper congestion control mechanism.

Before 'auto-negotiation' strategy is incorporated into standard specification 802.3u of IEEE, a few manufacturers has already produced Ethernet card that has auto-sensing capability. A number of switch devices and Ethernet cards are shown in Table 1, some of the devices has auto-negotiation functions while some has not.

TABLE 1 various combinations of states between an Ethernet hub (switch device) and Ethernet card with or without 'auto-negotiation' like function and operation thereof.

|  | Support only 10BASE-T hub (switch device) | Support only 100BASE-T hub (switch device) | New generation 10/100TX co-existent network and hub (switch device) | New generation of auto-negotiation 10/100TX co-existent hub (switch device) |
|---|---|---|---|---|
| Support only 10BASE-T network card | 10 Mbps | Change to a 100 Mbps network card | Manual switch of the hub (switch device) to 10 Mbps | Automatic switching of hub (switch device) to 10 Mbps |
| Network card with non-standard auto-sensing capability | Automatic switch of network card to 10 Mbps | Automatic switch of network card to 100 Mbps | Automatic switch of network card to 100 Mbps after manual switch of hub (switch device) to 100 Mbps | Manual switch of hub (switch device) and network card to 100 Mbps |
| 10/100TX co-existent network card with new generation auto-negotiation capability | Automatic switch of network card to 10 Mbps half-duplex | Automatic switch of network card to 100 Mbps | Manual switch of hub (switch device) and network card to 100 Bbps | Automatic switch of hub (switch device) and network card to 100 Mbps |

Due to the rapid progress in semiconductor technologies, the difference in the cost of producing a switch device and an Ethernet hub is getting smaller. Because of many advantages of a switch device, Ethernet hubs are gradually replaced by switch devices. Moreover, since a switch device can perform the functions provided by an Ethernet hub, combinations of devices detailed in Table 1 are all applicable to switch devices.

Furthermore, due to the multiplicity of transmission modes among different Ethernet devices, the automatic-negotiation relies on a set of priority sequence registered in a table to ensure the selection of an optimal transmission mode between two Ethernet devices. For example, a 10/100 Mbps dual speed network card is capable of operating at 10 Mbps or 100 Mbps. Under the priority algorithm, the priority sequence table preferably selects 100 Mbps. Table 2 is a priority setting for the different transmission modes for Ethernet devices having auto-negotiation capability.

TABLE 2

Priority setting of Ethernet devices with auto-negotiation capability

| Priority | Explanations |
| --- | --- |
| 1 | 100BASE-T2 full duplex |
| 2 | 100BASE-T2 |
| 3 | 100BASE-TX full duplex |
| 4 | 100BASE-T4 |
| 5 | 100BASE-TX |
| 6 | 10BASE-T full duplex |
| 7 | 10BASE-T |

In Table 2, full duplex transmission mode has a higher priority than half-duplex mode because full duplex has a much higher data transmission rate than half-duplex. Transmission mode 10BASE-T has the least priority because it has the slowest data transmission rate. By consulting the priority table 2, the most suitable mode for transmitting data between the switch device (hub) and the network card can be selected.

To increase the overall throughput after the best transmission mode is chosen, the switch device usually provides a congestion control mechanism for transmitting information packets among the transmission ports. According to the resulting auto-negotiation between the target device (for example, an network card) and the switch device, one of the following three congestion control modes are adopted: (1) When the target device has full-duplex transmission capacity and flow control capability, the switch device will opt for a flow control mode; (2) when the target device has full-duplex transmission capacity but no flow control capability, the switch device will opt for a drop control mode; and (3) when the target device has neither half-duplex transmission capacity nor flow control capability, the switch device will opt for a back-pressure control mode. In the backpressure control mode, the switch controller issues a collision signal to destroy an incoming packet. On detecting the collision, the workstation will branch into a binary exponential back-off algorithm to compute a waiting time before the packet is submitted again. In the drop control mode, the packet is directly dropped at the source port instead of sending to the congested target port. This is because the target device uses full duplex transmission and different transmission lines are used respectively for sending and receiving data. Further, the source port enters a flow control mode whenever the target port is congested. In subsequent stage, flow control windows (XOFF windows) are triggered. Once XOFF windows are triggered, the switch controller will control the flow of packets according to the number of free buffers present.

The congestion control method in a conventional switch controller has the following two drawbacks:

(1) The ports of a switch controller have a plurality of input buffers. Furthermore, a plurality of private buffers are reserved by the input terminals of the ports for private use. However, when the number of free output buffers in the port of the switch controller is insufficient, the deployment of buffers by other ports is not permitted. Hence, the capacity of the switch device is limited.

(2) The XOFF threshold value of the flow control window is fixed. Hence, the switch device is unable to adjust the XOFF threshold value dynamically according to the number of free buffers. Therefore, the management of shared memory in the switch controller can not achieve the best performance.

FIG. 1 is a block diagram showing the electrical connections in a conventional switch device. The switch device 100 in FIG. 1 has a plurality of ports (eight ports are shown in FIG. 1). Each port is connected to a physical layer device 130. A static random access memory (SRAM) 120 is provided in the Ethernet control device 110 serving as a shared memory or buffer. On receiving a network packet, the port transfers and stores the packet in the shared buffer until the packet is retrieved by a target port.

FIG. 2 is a diagram showing the congestion control mechanism for resolving congestion in a conventional switch controller. When both the switch device and the network card can operate in full duplex mode and have flow control capability, flow control mode is called upon to resolve network congestion problems. While testing the performance of switch controller, there is an item known as head of line blocking (HOL). As shown in FIG. 2, head of line blocking refers to the blocking of the output of a port in the switch controller due to occupation so that other ports is unable to function normally. For example, assume that all ports are capable of transmitting data at 100 Mbps. When port 2 transmits data at 100% bandwidth to the port 3 while port 0 also transmits data at 50% bandwidth to the port 3, the total amount of data transmitted to port 3 is 150 Mbps. Hence, the amount of data going to the port 3 exceeds its admissible limit. Consequently, some packets may accumulate in the output queues of the port 3. In the meantime, if the port 4 needs to transmit data at 100% bandwidth to port 5, the transmission fails because all the free buffers are occupied due to the heavy congestion at port 3. Therefore, head of line blocking is a major factor affecting the efficiency of the switch controller.

In this invention, a number of private buffers are reserved for each port. Thus, although the port 3 is heavily congested, data transmission between port 4 and port 5 can still carry on because the port 5 has private buffer space.

SUMMARY OF THE INVENTION

Accordingly, the object of the present invention is to provide a switch device and a method for easing congestion in a data transmission network by assigning a number of private buffers to the output terminals of ports of a switch controller. In other words, a number of private buffers (for example, four private buffers) are retained by each port while the rest of the buffers are shared by all the ports. The number of reserved buffers is related to the size of static random access memory used by the switch device so that the disadvantage of a conventional device is prevented.

A second object of this invention is to provide a switch device and a method for easing congestion in a data transmission network by making the triggered flow control window threshold (XOFF threshold) value of a switch controller adaptive to demand. The switch controller is capable of adjusting the value of the triggered XOFF threshold dynamically according to the number of free buffers present. Hence, the shared memory inside the switch controller can be utilized optimally and the drawbacks of a conventional device can be removed.

To achieve these and other advantages and in accordance with the purpose of the invention, as embodied and broadly described herein, the invention provides a switch controller inside a switch device capable of easing network congestion, the switch controller has a plurality of ports and the switch device further includes a shared buffer and a plurality of physical layer devices (PHY), the shared buffer can be divided into a plurality of buffering units. The switch controller comprises a buffer control device, a plurality of port control devices, a forwarding control device, and a queue control device. The buffer control device is coupled to the shared buffer for assigning and releasing the buffering units. The plurality of port control devices are coupled to the physical layer devices and the buffer control device, in which each port control device has a one-to-one correspondence with the ports, the port control device that corresponds to a source port receives a network packet and then sends the packet to at least one of the buffering unit(s) for storage. The forwarding control device is coupled to the port control devices, and a target port of the packet is determined according to a header of the network packet. The queue control device is coupled to the port control devices and the buffer control device, wherein the queue control device further includes a plurality of output queues, each output queue has a one-to-one correspondence with the port control devices, each output queue has a number of reserved buffering units, and the buffering units for storing the packets are linked to the output queue corresponding to the port control device at a target port. The source port triggers or terminates a congestion mode to control the number of free buffering units in response to the number of reserved buffering units in the output queue.

To achieve these and other advantages and in accordance with the purpose of the invention, as embodied and broadly described herein, the invention further provides a method for easing data transmission congestion in a switch device having a plurality of ports. The switch device includes a shared buffer capable of dividing into a plurality of buffering units. The method comprises the steps as follows. A plurality of output queues are provided, in which the output queues have a one-to-one correspondence with the ports, and each output queue has a number of reserved buffering units. The buffering unit(s) are then assigned in the shared buffer. A packet is received from a source port and storing the packet in an assigned buffering unit. The target port of a packet is determined according to a header of the packet. Then, the buffering unit containing the packet is linked to the output queue that corresponds to the target port. The free buffering units are thus controlled according to a number of reserved buffering units in the output queue and a triggering or a terminating condition of the source port.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
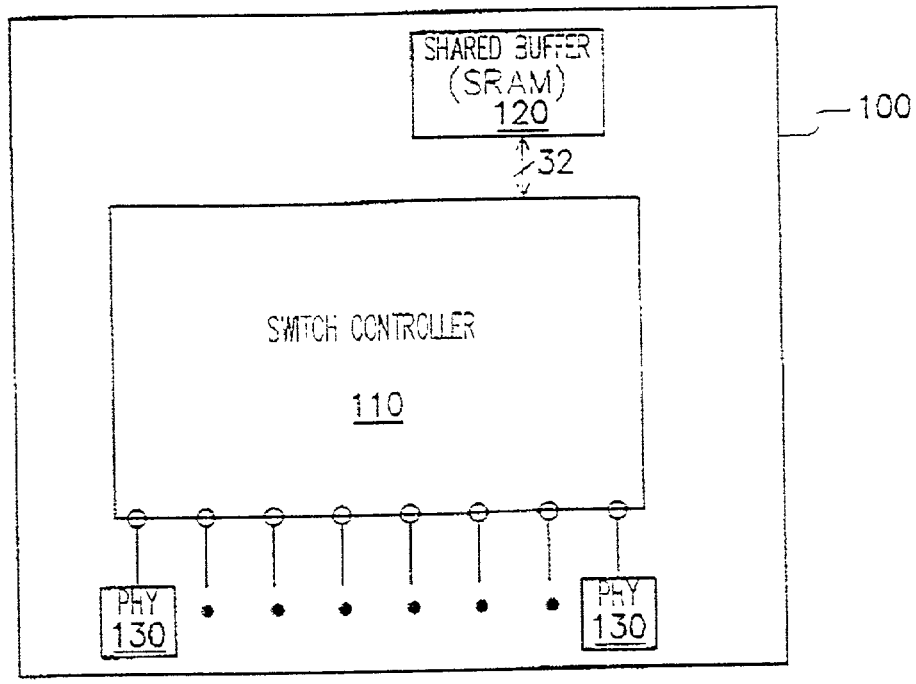
FIG. 1 is a block diagram showing the electrical connections in a conventional switch device.
Figure 2:
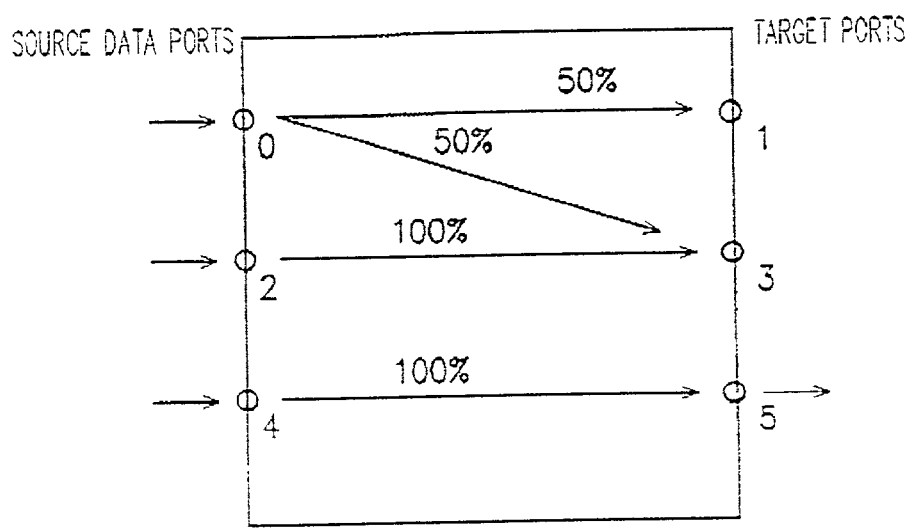
FIG. 2 is a diagram showing the congestion control method for resolving terminal congestion in a conventional switch controller.

Reference will now be made in detail to the present preferred embodiments of the invention, examples of which are illustrated in the accompanying drawings. Wherever possible, the same reference numbers are used in the drawings and the description to refer to the same or like parts.

Figure 3:
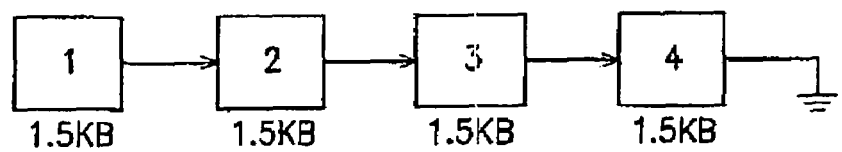
FIG. 3 is a diagram showing the connectivity of private output queues for controlling data congestion in an switch controller according to this invention.

FIG. 3. is a diagram showing the connectivity of private output queues for controlling data congestion in a switch controller according to this invention. Each port of the switch controller of this invention has a private output queue. When a packet is received from one of the ports, the packet is sent to the private output queue. As shown in FIG. 3, the largest packet Ethernet capable of receiving is usually 1518 bytes (not including preamble and SFD columns). Hence, each buffer must have a size of at least 1.5 KB. To request a buffer space, a signal is sent to a buffer control device so that a buffer is linked to the output queue. After the packet is forwarded and the storage space is emptied, linkage between the queue and the buffer is released and the associated buffer becomes free. For example, the queue in FIG. 3 is linked to four buffers.

Figure 4:
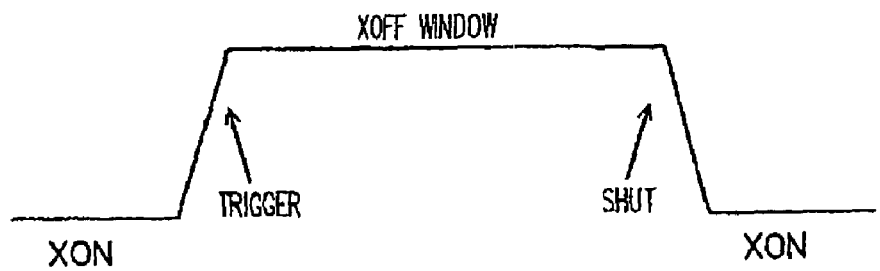
FIG. 4 is a diagram showing the use of XON-XOFF window to control congestion in an switch controller.

FIG. 4 is a diagram showing the use of XON-XOFF window to control congestion in a switch controller. As shown in FIG. 4, in the absence of flow congestion in a switch controller, every ports can transmit packets normally. On the other hand, when a particular port experiences congestion, the switch controller will carry out congestion control according to the result of auto-negotiation. If backpressure control mode is employed, the switch controller will issue a jam signal to destroy the packet. On sensing the jam signal, the workstation will branch off into a binary exponential backoff algorithm to find out waiting period before re-transmission. If the drop control method is employed, since signal transmission and reception are respectively on different transmission lines, jam signals cannot be employed to remove the packet. The packet can only be dropped at the switch controller so that the packet will not be transferred to the target port. If both the switch controller and the network card of the workstation are full duplex and have flow control capability, then flow control mode is used. As shown in FIG. 4, when the target port of the packet is congested, the source port will step into a XOFF window. The source port is now under flow control. After stepping into the XOFF window, any incoming packets from the source port of the switch controller are managed according to the number of free buffers. In other words, the bulk of traffic is controlled by the source port. The control remains in the XOFF window until the number of free buffers is returned to a level suitable for executing normal data transmission to or from the target port. Under such circumstances, the XOFF window is released so that control is returned back to XON.

Figure 8:
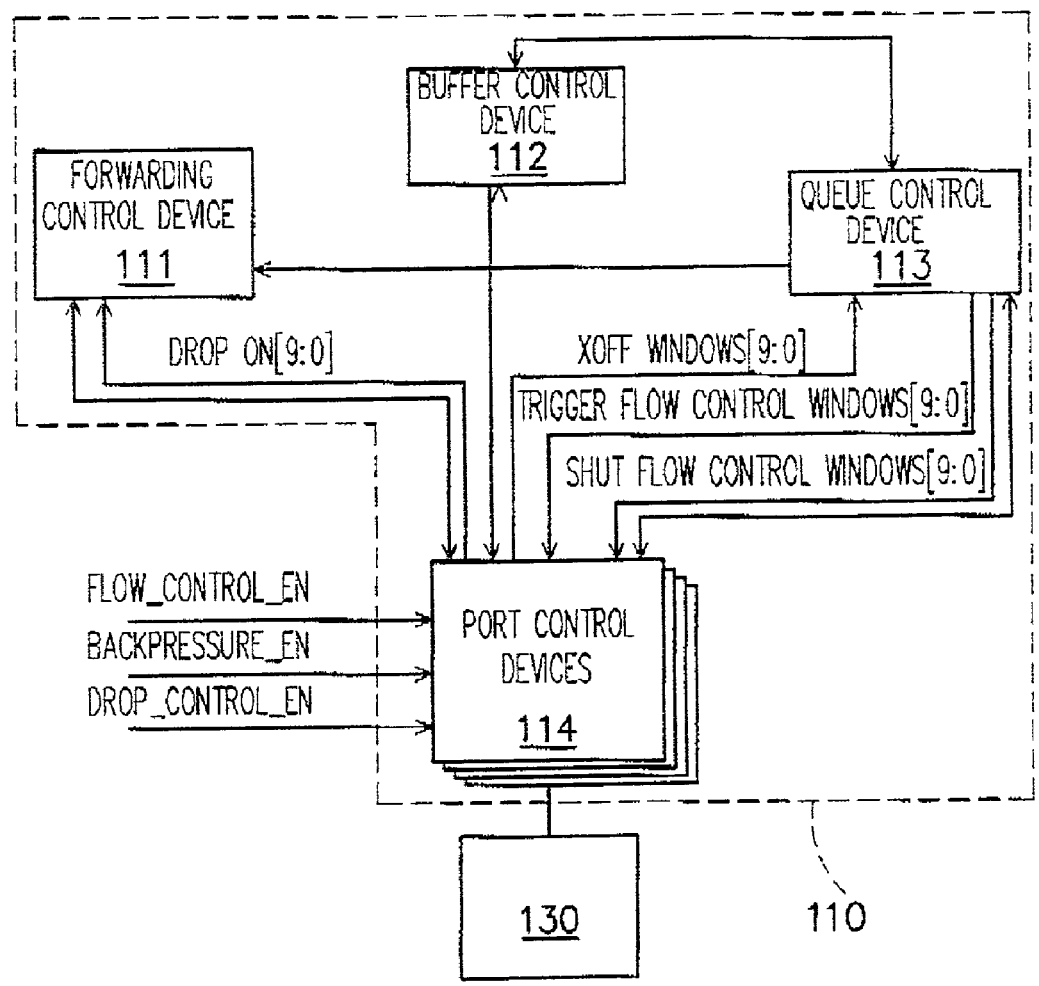
FIG. 8 is a block diagram showing the electrical connection of the switch controller according to this invention.

In this invention, flow control is based on the XON/XOFF windows. In the XON window, the source port is not in a congested state. Hence, any incoming packet can be transmitted normally. If an incoming packet exceeds the limit imposed by the congestion controll, congestion control will jump to the XOFF window after the packet is transferred from the source port to the output queue of the target port. In the XOFF window, the source port is in a congestion control state. Consequently, any incoming packet will trigger a congestion control operation according to the selected strategies. FIG. 8 is a block diagram showing the block diagram of the switch controller according to this invention. As shown in FIG. 8, the drop control mechanism under the condition of DROP_EN=1 used in the forwarding control device 111 is based on the congestion window of each port. The congestion window is defined under the following conditions: (1) any one of the port in the XOFF window, or (2) one target port steps into the XOFF window if the number of reserved buffer is zero. The decision to enable the XON/XOFF window and DROP terminal is provided by the transmission medium access control (TMAC) device of the switch controller 110 according to the state of the port and the plurality of management signals input from the queue control device 113.

In the XOFF window, the related congestion control operations includes: (1) Flow control operation: A packet is output to the output queue by unicasting or broadcasting. If the limit imposed by the congestion control is exceeded, the queue control device 113 will generate a triggering signal to trigger the transmission medium access control (TMAC) device of the source port, so that a pause time (for example, FFFFH) flow control frame is transmitted. The following two conditions will lead to the congestion control: (i) $\phi <= \max\{\Psi, 28\}$ and $R[k]=0$, where $\phi$ represents the number of free buffers, $\Psi$ represents the total number of reserved buffers in all the ports, $$\Psi = \sum_{k=0}^{9} R[k].$$

$R[k]$ represents the number of reserved buffers in the $k^{th}$ port. (ii) Any one of the ports is already in XOFF and $R[k]=0$. The theory is explained in detail using FIG. 5. As a particular source port is in the XOFF window, a XOFF triggering signal will still be emitted from the queue control device 113 so that the TMAC device 1144 will send out a pause time (for example, FFFFH) flow control frame. Although this may lead to using a wider bandwidth in executing flow control operation, repetitive transmission promises the successful reception of the XOFF flow control frame. (2) Back pressure control of half-duplex port: when a non-local packet is received, the input control device 1141 will generate a non-local signal to inform the TMAC device 1144. If the TMAC device 1144 is in the XOFF window and the port is half-duplex, the TMAC device 1144 will destroy the packet. (3) Drop control of the reserved private buffers: when an incoming packet is coming from a source port already in DROP_ON window and the target port is already in the congestion control window, the packet can be detected by forwarding control device 111 during a lookup operation. The forwarding control device 111 then masks the port so that the input control device 1141 is able to drop the packet. Note that the DROP_ON window guides the specified port to enable the drop function within a given time period so that the DROP_ON window is determined by the TMAC device. When any one of the ports is already in the XOFF window and that $R[k]=0$, the queue control device 113 will decide to turn on the congestion control window of the $k^{th}$ port.

Figure 5:
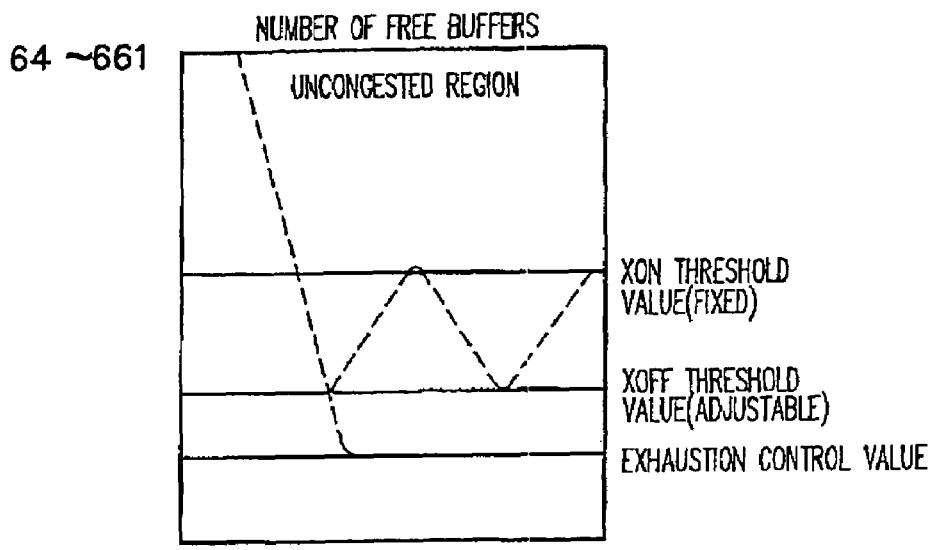
FIG. 5 is graph showing the relationship between the number of free buffers and the triggering of the XON/XOFF windows in the congestion control method used in the switch controller according to this invention.

FIG. 5 shows the relationship between the number of free buffers and the triggering of the XON/XOFF windows in the congestion control mechanism used in the switch controller according to this invention. As shown in FIG. 5, the number of free buffers can vary, for example, between 64 to 661, which depends on the type of memory used. XON threshold value represents the point of decision by the switch controller whether to terminate the flow control or not. The threshold value can be programmed but is fixed once the programming is completed. In other words, the XON threshold value is an unchangeable constant after programming. The threshold value is about half of the free buffers minus ten. When the number of free buffers is smaller than the XOFF threshold value, the switch controller will step into the flow control window to execute flow control operation. Flow control operation will immediately start after going into the flow control window. Because the packets accumulated in the output queue need to send out, the number of free buffers will continue to decrease. Sometimes, all the virtual free buffers are used up. When the virtual free buffers are all used up, the number of reserved buffer in each port is zero. Although new packets are still accepted, flow control is triggered to limit the process. When the virtual free buffers are all used up, all incoming packets are dropped off. The purpose of establishing an XOFF threshold value is: (1) to prevent a few ports that demand large quantities of buffers from exhausting traffic resource . Hence, the XOFF threshold value must be greater than or equal to the total number of reserved buffers. (2) To prevent from dropping packets due to insufficient free buffers and a slow response. In this embodiment, the flow control response time of each port is two buffers. The XOFF threshold value is adaptive. That means, the XOFF threshold value can be adjusted according to the number of reserved buffers demanded so that the system is more flexible. The threshold value can be determined using the parameters including:

$Q[k]$: queue length of the $k^{th}$ output port;
$R_{max}$: the greatest number of reserved buffers in each port;
$R[k]$: the number of reserved buffers in the $k^{th}$ port;
$\Psi$: the total number of reserved buffers, $$\Psi = \sum_{k=0}^{9} R[k];$$

$\Phi$: the number of free buffers;

C: the number of reserved buffers in the virtual free space, C=10 (preset value);

Ω: the number of virtual free buffers, when Φ<=C, Ω=0, and when Φ>C, Ω=Φ-C;

Θ: XON threshold value

Step into the XOFF window if (Ω=0), (Ω<=max {Ψ, 28} and R[k]=0), or (any port already in the XOFF window and R[k]=0).

Any input port steps out of the XOFF window if (Ω>Θ).

Amongst the parameters listed, Q[k] represents queue length of the $k^{th}$ output port. $R_{max}$ represents the greatest number of reserved buffers in each port. Ψ represents the total number of reserved buffers from port 0 to port 9, $$\Psi = \sum_{k=0}^{9} R[k].$$

R[k] represents the number of reserved buffers in the $k^{th}$ port. Φ represents the number of free buffers. C represents the number of reserved buffers in the virtual free space, for example 10. Ω represents the number of virtual free buffers. When Φ<=C, Ω=0. When Φ>C, Ω=Φ-C. Θ represents XON threshold value. For example, Q[k=3]=3 indicates the length of the third port is 3. $R_{max}$ is 4. R[k]=4-3 =1 indicates that three of the four reserved buffers are used. If the number of reserved buffers in each port is 2, then $$\Psi = \sum_{k=0}^{9} R[k] = 20.$$

Φ=22 indicates the number of free buffers is 22. C represents the number of reserved buffers in the virtual free space, i.e., a preset response time. C is set to a value of 10, and the value of XOFF threshold value must be greater than C. Ω represents the number of virtual free buffers and the value is Φ-C=22-10=12. In other words, the number of free buffers appears to be 12 but the number of free buffers is actually 22 so that the exhaustion of buffers is prevented.

In general, when the following three conditions are met, the switch controller will step into the XOFF window: (1) Ω=0 indicates no virtual free buffers is available, and hence the port must step into the XOFF window to execute flow control; or (2) Ω<=max {Ψ, 28} and R[k]=0, for example Ψ=20, indicates the number of virtual free buffer <=28 or Ψ, and the number of reserved buffers in the target port is zero; or (3) any port already in the XOFF window and R[k]=0, indicates at least one of the ports has stepped into the XOFF window, so the conditions for stepping into the XOFF window is relaxed. Furthermore, the number of reserved buffers in the target port is zero so that the source port will step into the XOFF window. As long as one of the three aforementioned conditions is met, the source port will step into the XOFF window. Hence, the source port is prevented from sending any more packets so that the target port is able to step out from the XOFF window earlier. As soon as the number of virtual free buffers is greater than the XON threshold value, all the port already in the XOFF window will simultaneously jump out from the XOFF window. Hence, the normal transmission is resumed.

Figure 6:
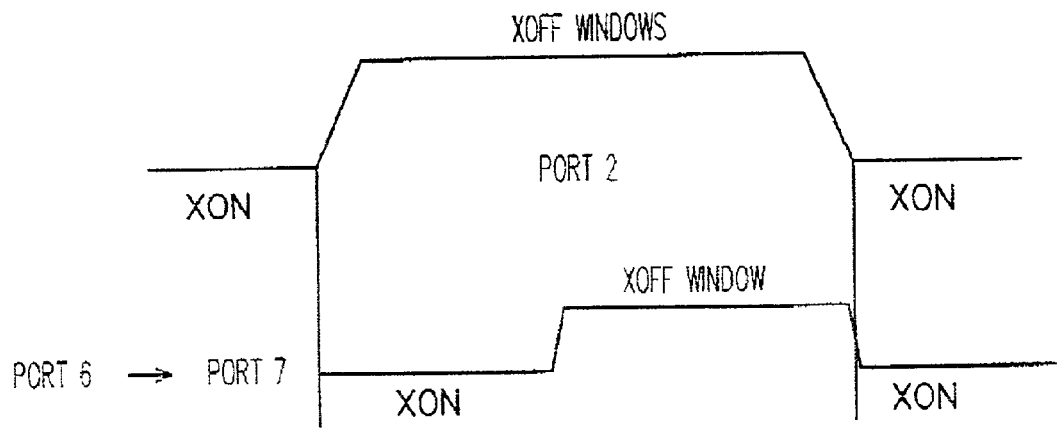
FIG. 6 is a diagram showing the relaxation of the conditions of other ports to trigger the XOFF window after one of the ports has already been triggered and the concurrent shutting of all the XOFF windows of ports in the end for the congestion control method used in the switch controller according to this invention.

FIG. 6 is a diagram showing the relaxation of the conditions of other ports to trigger the XOFF window after one of the ports has already been triggered and the concurrent shutting of all the XOFF windows of ports in the end for the congestion control mechanism used in the switch controller according to this invention. As shown in FIG. 6, flow control operation is being conducted as soon as the second port steps into the XOFF window. To prevent the continued deterioration of congestion, conditions for other ports to step into the XOFF window is relaxed, such as sending a packet from port 6 to port 7. Since the number of reserved buffer for port 7 is zero and port 2 is already in the XOFF window, the port 7 also steps into XOFF window to carry out flow control. When the number of free buffers is greater than the XON threshold value, all the ports jump away from the XOFF window concurrently and releasing flow control at the same time.

Figure 7:
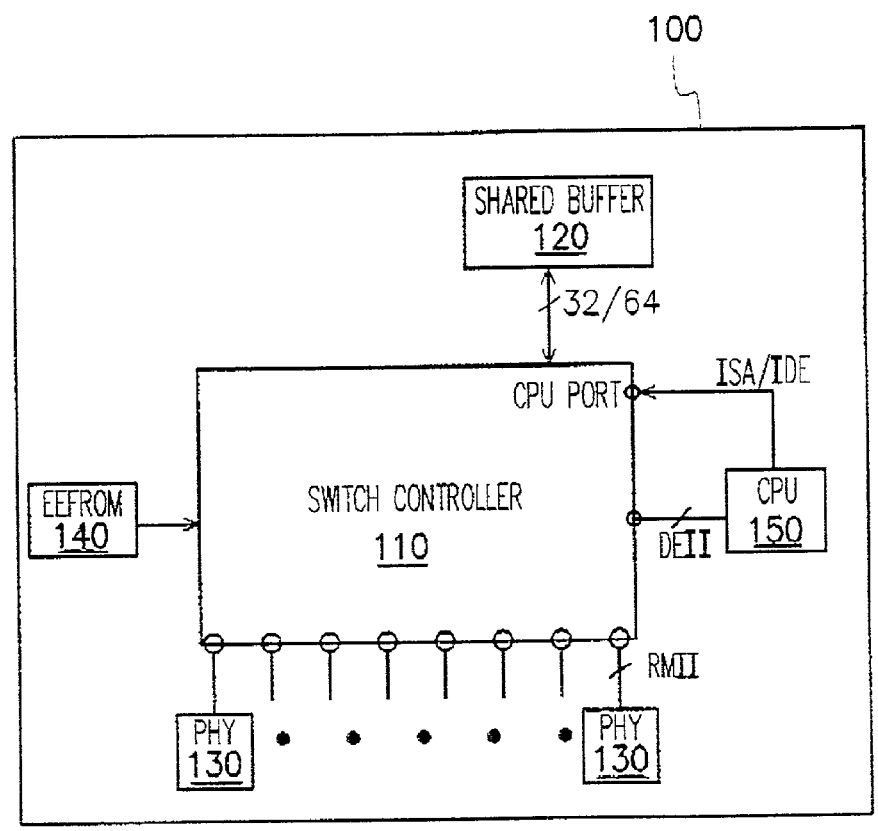
FIG. 7 is a block diagram showing the connection of the switch controller of the switch device according to this invention.

FIG. 7 is a block diagram showing the connection of the switch controller of the Ethernet switching device according to this invention. As shown in FIG. 7, the Ethernet switching device 100 includes an switch controller 110, a static random access memory unit 120, a plurality of physical layer devices 130, an electrical erasable programmable read only memory (EEPROM) 140 and a central processing unit (CPU150). Size of the static random access memory unit 120 may be determined by the jumpers. The controller 110 is coupled to the CPU150 port via a medium independent interface (MII). The controller 100 has a CPU port that couples with another CPU 150 port via an ISA/IDE interface line. In the meantime, the controller 110 is connected to a plurality of physical layer devices 130 through a reduced medium independent interface (RMII). RMII reduces pin out number so that the 14 pins of the MII can be reduced to just six.

FIG. 8 is a block diagram showing the electrical connection of the switch controller according to this invention. As shown in FIG. 8, the switch controller 110 includes a plurality of port control devices 114, a queue control device 113, a forwarding control device 111 and a buffer control device 112. The plurality of port control deice 114 are coupled to the plurality of physical layer devices (PHY) 130 and a plurality of external signals. Through these physical layer devices 130, a plurality of state signals is received from the connection devices on the other end. These state signals include duplex mode and flow control capability signals. According to the flow control enable (Flow_Control_En) signal, the drop control enable (Drop_Conrol_En) signal and the backpressure enable (Backpressure_En) signal, the congestion control mechanism used by the switch controller 110 is selected. The flow control enable signal, the backpressure enable signal and the drop control enable signal can be determined by jumpers. The plurality of state signals generates a plurality of flow control window (XOFF_Window[9:0]) signals to the queue control device 113. According to the flow control window (XOFF_Window[9:0]) signals and the external signals, the selection of drop control is decided whether the drop-triggering signal DROP_ON[9:0] should be enabled.

The forwarding control device 111 is coupled to the plurality of port control devices 114. According to the heading of packet received by the plurality of port control devices 114, a table lookup is carried out to determine the address of the target port for a packet. The buffer control device 112 is coupled to the plurality of port control devices 114. Each port control device 114 has been assigned a number of private buffers in the shared buffer 120. The number of private buffers can be assigned by the EEPROM 140 or the CPU 150. According to the requests by the plurality of port control devices 114, the buffer control device 112 assigns or releases the private buffers.

The queue control device 113 is coupled to the plurality of port control devices 114, the buffer control device 112 and the forwarding control device 111. Each port control device 114 has a corresponding output queue in the queue control device 113. According to the requests from the various port control devices 114, the queue control device 113 establishes links in the output queues. The congestion control mechanism selected by each of the port control device 114 is activated according to the plurality of window flow control signals and the lengths of the plurality of the output queue. For example, if the output queues in the queue control device 113 experience congestion, a congestion triggering (CONGEST_ON) signal is transmitted to the forwarding control device 111 and the flow control window [9:0] signal is also triggered to request flow control of the source port.

Figure 9:
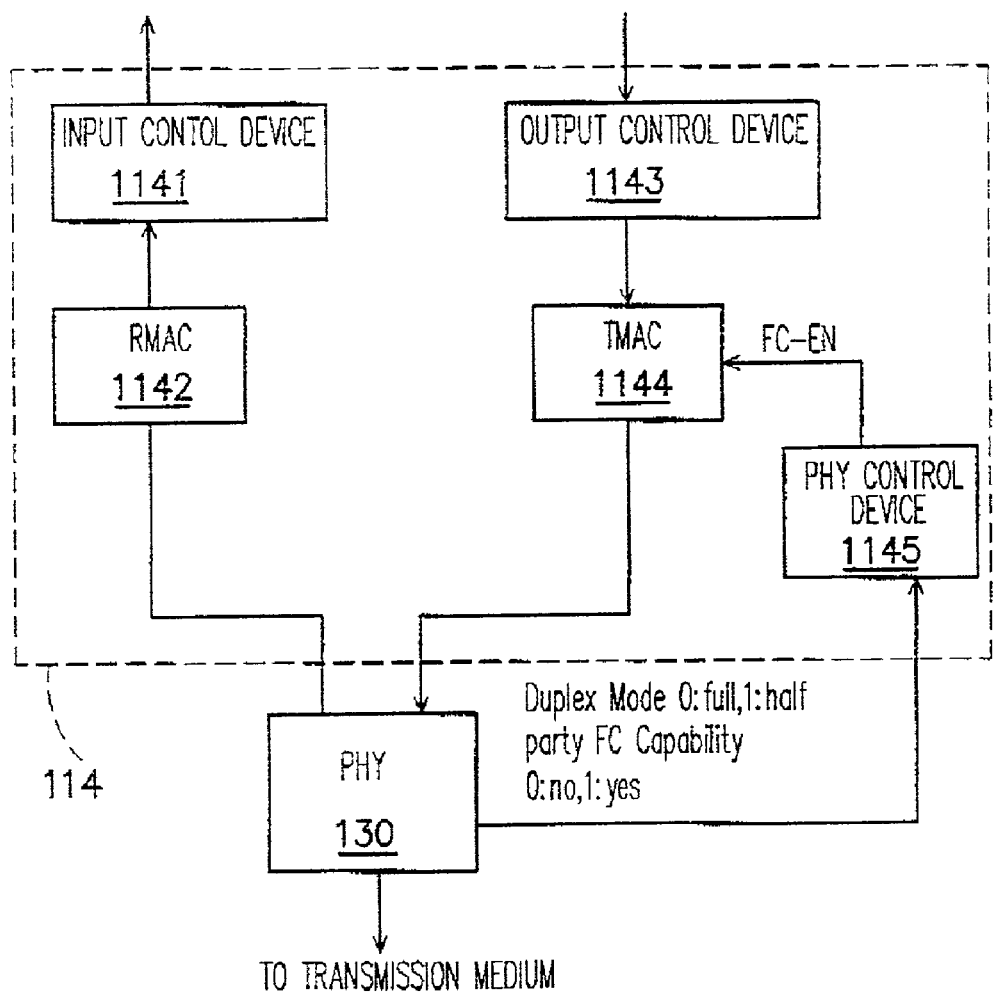
FIG. 9 is a block diagram showing the port control device of a switch controller according to this invention.

FIG. 9 is a block diagram showing the port control device of an switch controller according to this invention. Each port control device 114 includes a receive medium access control (RMAC) device 1142, an input control device 1141, an output control device 1143, a transmission medium access control (TMAC) device 1144 and a physical layer control (PHY control) device 1145. The RMAC device 1142 is coupled to one of the physical layer device 130. On receiving a network packet, the RMAC device 1142 inspects the packet for any errors. If no errors are found, the packet is received, otherwise the packet is returned. The input control device 1141 is coupled to the RMAC device 1142, the queue control device 113 and the buffer control device 112. According to the network packet and the request for private buffer assignment to the buffer control device 112, the input control device 1141 signals the queue control device 113 to request queuing to the output queues. The output control device 1143 is coupled to the queue control device 113 and the buffer control device 112 for outputting packets from the output queues and releasing the free buffers to the buffer control device 112 thereafter. The TMAC device 1144 is coupled to the output control device 1143 and one of the physical layer devices 130. According to the plurality of window flow control (XOFF_Window[9:0]) signals and the plurality of external signals, a DROP_ON signal to the forwarding control device 111 can be asserted so as to drop the packet. The physical layer control device 1145 is coupled to the TMAC device 1144 and one of the physical layer devices 130. According to the plurality of state signals, the physical layer control device 1145 is able to send out a flow control enable (FC_EN) signal to the TMAC device 1144.

This invention also provides a method for resolving network congestion problems. The method relies on a plurality of external signals, a plurality of state signals and a plurality of congestion control mechanism.

A plurality of packets are received from network and then sent to the plurality of port control devices 114. According to the plurality of external signals, the plurality of state signals, the port control devices 114 generate a plurality of flow control window signals. The plurality of packets are passed into the forwarding control device 111 where the target port of each packet can be found in a look-up table. If the target port is already in a congested state and the source port where the packet comes from has no flow control capability, the packet is dropped. On the other hand, if the target port has not yet stepped into the congested state, a request for assigning private buffers from the shared buffer 120 is issued to the output queue, corresponding to the target port in the queue control device 113. Furthermore, according to the plurality of window control flow (XOFF_Window[9: 0]) signals and lengths of the plurality of output queues, the congestion control mechanism in each port control device 114 is selected.

In this embodiment, each port has an output queue. According to the size of the packet, a signal requesting output buffers is sent by the input device. After the packet is transmitted, the buffers are is released back to the output queue. In addition, each port has private output buffers. These private output buffers are located at the output terminals of the port. The private output buffers are shared by each port so that the management of ports is more flexible. Furthermore, these output private buffers and the shared buffers 120 are size related. When the shared buffers 120 have a larger capacity (for example, 64 KB×64), the private output buffers can be set to a higher value. On the other hand, if the shared buffers 120 have a smaller capacity (for example, 64 KB×32) the private output buffers can be set to a smaller value.

The plurality of external signals include flow control enable signal, drop control enable signal and backpressure enable signal. The values of the flow control enable signal, the backpressure enable signal and the drop enable signal are determined by jumpers. The plurality of state signals includes full duplex mode signal and flow control capability signal. The flow control further includes a flow control frame. The frame includes a 16-bit pause time. When the flow control window is triggered, the 16-bit pause time has a value of FFFFH. Alternatively, when the flow control window is shut, the 16-bit pause time has a value 0000H. The flow control window can be triggered under the following conditions:

(1) if the number of virtual free buffer in the shared buffer 120 is zero; or (2) if the number of virtual free buffer is smaller than or equal to the largest value between the total reserved value and 28, and the number of reserved buffers in the target port control device for a particular packet is also zero; or (3) if one of the port control devices has already triggered the flow control window and the number of reserved buffer in the target port of a particular packet is zero.

Wherein the number of virtual free buffer is the number of free buffers in the shared buffer 120 minus the number of reserved buffers. For example, ten reserved buffers are pre-assigned.

The flow control window includes a shut flow control window threshold value, XON. When the number of free buffers is greater than the XON threshold value, the flow control window is shut. The value of the XON threshold can be set through the externally connected EEPROM 140 or the CPU 150. The value is about half of the shared buffer 120. Capacity of the shared buffer 120 is generally determined by the size of the static random access memory (SRAM) unit. Furthermore, capacity of the SRAM can be obtained through jumper setting. For example, capacity of the SRAM unit can be 32 KB×32 or 64 KB×32. The number of private buffers inside the shared buffer 120 can also be assigned by the externally connected EEPROM 140 or CPU 150.

The flow control mode further includes a triggering flow control window threshold value, XOFF and XOFF thresholds are adjustable. The value of XOFF threshold is the larger value between the total reserved quantity and the value 28. The total reserved quantity is the sum of the reserved quantity in each port. Since the reserved quantity is a variable, the triggering flow control window threshold value (XOFF threshold) is 28 when the total reserved quantity is smaller than 28. On the other hand, if the total reserved quantity is greater than 28, the reserved quantity is retained to serve as a threshold value. Hence, flexibility is increased.

In summary, this invention provides a method for easing network congestion. The present invention provides at least the following advantages:

(1) By flexibly adjusting the number of reserved buffers, XOFF threshold value is variable. Hence, throughput of the transmission system can be optimized.

(2) By reserving a number of private buffers at the terminal of the port in a switch and allowing each port to share all the buffers, all the buffers are fully utilized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A switch controller inside a switch device capable of easing network congestion, the switch controller has a plurality of ports and the switch device further includes a shared buffer and a plurality of physical layer devices (PHY), the shared buffer can be divided into a plurality of buffering units, the switch controller comprising:

a buffer control device coupled to the shared buffer for assigning and releasing the buffering units;

a plurality of port control devices coupled to the physical layer devices and the buffer control device, wherein each port control device has a one-to-one correspondence with the ports, the port control device that corresponds to a source port receives a network packet and then sends the packet to at least one of the buffering unit(s) for storage;

a forwarding control device coupled to the port control devices, and a target port of the packet is determined according to a header of the network packet; and a queue control device coupled to the port control devices and the buffer control device, wherein the queue control device further includes a plurality of output queues, each output queue has a one-to-one correspondence with the port control devices and the buffering unit for storing the packets is linked to the output queue corresponding to the port control device at a target port;

wherein each output port has a number of reserved buffering units which are not used by any other output port, and the source port triggers or terminates a congestion mode to control the number of free buffering units in response to the number of reserved buffering units in the output queue, and each port control device includes:

a receive medium access control device coupled to one of the physical layer devices, wherein the received medium access control device inspects any incoming network packet for errors, if no errors is found, the packet is accepted, otherwise the packet is returned;

a receive control device coupled to the receive medium access control device, the queue control device and the buffer control device, the receive control device issues requests to the buffer control device to assign at least one buffering units(s) for storing the packet and signals the queue control device to request queuing to the corresponding output queue;

an output control device, coupled to the queue control device and the buffer control device for outputting the packet from the output queue, and releasing the buffering units after the buffer control unit has sent out the packet;

a transmission medium access control device coupled to the output control device and one of the physical layer devices for outputting the packet to the physical layer device, and when the congestion control mode is triggered, the transmission medium access control device within the port control device that corresponds to the source port sends out a control signal to execute the congestion control operation; and a physical layer control device coupled to the transmission medium access control device and one of the physical layer devices, receiving a plurality of state signals from an external network device to select a proper congestion control mode.

2. The switch controller of claim 1, wherein a $k^{th}$ port is the target port and a plurality of parameters are defined as follows:

Q[k]: length of the output queue of the $k^{th}$ port;

$R_{max}$: number of maximum buffering units reserved for each port;

R[k]: number of buffering units reserved for the $k^{th}$ port, R[k]=0 when $R_{max}$<=Q[k]; and R[k]=$R_{max}$−Q[k] when $R_{max}$>Q[k].

Ψ: the total number of reserved buffering units, i.e., $$\Psi = \sum_{k=0}^{n} R[k];$$

Φ: number of free buffering units;

C: the number of reserved buffering units in a virtual free space;

Ω: number of virtual free buffers, when Φ<=C, Ω=0, and when Φ>C, Ω=Φ−C;

W: minimum number of reserved virtual buffering unit; wherein the congestion control mode is triggered when Ω<=max {Ψ, W} and R[k]=0.

3. The switch controller of claim 2, wherein the number of reserved buffering unit in virtual free space C is 10, and the lowest number of reserved buffering units in virtual free space W is 28.

4. The switch controller of claim 1, wherein a $k^{th}$ port is the target port and a plurality of parameters are defined as follows:

Q[k]: the output queue length of the $k^{th}$ port;

$R_{max}$: the greatest number of buffering units reserved by the port;

R[k]: the number of buffering units reserved by the $k^{th}$ port, when $R_{max}$<=Q[k], R[k]=0, and when $R_{max}$>Q[k], R[k]=$R_{max}$−Q[k];

wherein the congestion control mode for the $k_{th}$ port is triggered when any of the other ports has already triggered a congestion control mode and R[k]=0.

5. The switch controller of claim 1, wherein the controller further includes a CPU port capable of connecting with a CPU for a two-way data transmission via an IDE (Integrated Drive Electronics) interface based on an ISA (Industry Standard Architecture) bus standard.

6. The switch controller of claim 1, wherein the congestion control mode includes a backpressure control mode, a drop control mode and a flow control mode.

7. The switch controller of claim 6, wherein the backpressure control mode is selected when the external network device operates in a half-duplex mode without flow control capability.

8. The switch controller of claim 6, wherein the drop control mode is selected when the external network device operates in a full-duplex mode but without flow control capability.

9. The switch controller of claim 6, wherein the flow control mode is selected when the external network device operates in a full-duplex mode with flow control capability.

10. A method for easing data transmission congestion in a switch device having a plurality of ports, the switch device includes a shared buffer capable of being divided into a plurality of buffering units, comprising the steps of:
providing a plurality of output queues, wherein the output queues have a one-to-one correspondence with the ports;
assigning the buffering units in the shared buffer;
receiving a packet from a source port and storing the packet in an assigned buffering unit;
determining a target port of a network packet according to a header of the packet;
linking buffering unit containing the stored network packet to the output queue that corresponds to the target port;
outputting the network packet from the target port;
releasing the buffering unit after the network packet is output;
selecting a mode of congestion control in response to an external network device; and
controlling free buffering units according to a number of reserved buffering units in the output queue and a triggering or a terminating condition of the source port;
wherein each output port has a number of reserved buffering units which are not used by any other output port, and the congestion control mode includes a backpressure control mode, a drop control mode and a flow control mode.

11. The method of claim 10, wherein a $k^{th}$ port is the target port and a plurality of parameters are defined as follows:
$Q[k]$: length of the output queue of the $k^{th}$ port;
$R_{max}$: number of maximum buffering units reserved for each port;
$R[k]$: number of buffering units reserved for the $k^{th}$ port,
$R[k]=0$ when $R_{max}<=Q[k]$; and
$R[k]=R_{max}-Q[k]$ when $R_{max}>Q[k]$
$\Psi$: the total number of reserved buffering units, i.e., $$\Psi = \sum_{k=0}^{n} R[k];$$

$\Phi$: number of free buffering units;
$C$: number of reserved buffering units in a virtual free space;
$\Omega$: number of virtual free buffers,
when $\Phi<=C$, $\Omega=0$, and when $\Phi>C$, $\Omega=\Phi-C$;
$W$: minimum number of reserved virtual buffering unit;
wherein a congestion control mode is triggered when $\Omega>=\max\{\Psi, W\}$ and $R[k]=0$.

12. The method of claim 11, wherein the number of reserved buffering unit in virtual free space C is 10, and the minimum number of reserved buffering units in virtual free space W is 28.

13. The method of claim 10, wherein a $k^{th}$ port is the target port and a plurality of parameters are defined as follows:
$Q[k]$: length of the output queue of the $k^{th}$ port;
$R_{max}$: number of maximum buffering units reserved by the port;
$R[k]$: number of buffering units reserved by the $k^{th}$ port,
$R[k]=0$ when $R_{max}<=Q[k]$; and
$R[k]=R_{max}-Q[k]$ when $R_{max}>Q[k]$;
wherein a congestion control mode is triggered when any one of the port has already triggered a congestion control mode and $R[k]0$.

14. The method of claim 10, wherein a plurality of parameters are defined as follows:
$\Phi$: the number of free (unassigned) buffering units;
$C$: the number of reserved buffering units in a virtual free space;
$\Omega$: the number of virtual free buffers,
when $\Phi<=C$, $\Omega=0$, and when $\Phi>C$, $\Omega=\Phi-C$;
when $\Phi=0$, the congestion control mode is triggered.

15. The method of claim 10, wherein the backpressure control mode is selected when the external network device operates in a half-duplex mode without flow control capability.

16. The method of claim 10, wherein the drop control mode is selected when the external network device operates in a full-duplex mode but without flow control capability.

17. The method of claim 10, wherein the flow control mode is selected when the external network device operates in a full-duplex mode with flow control capability.

* * * * *